United States Patent
Scown et al.

(10) Patent No.: US 7,059,565 B2
(45) Date of Patent: Jun. 13, 2006

(54) AIRCRAFT FRAME HOLE PATTERNS AND BRACKETS, AND ASSOCIATED METHODS

(75) Inventors: Stephen L. Scown, Seattle, WA (US); Gregory A. Tubbs, Seattle, WA (US); Cory M. Hitchcock, Seattle, WA (US)

(73) Assignee: The Boeing Company, Seattle, WA (US)

( * ) Notice: Subject to any disclaimer, the term of this patent is extended or adjusted under 35 U.S.C. 154(b) by 21 days.

(21) Appl. No.: 10/927,606

(22) Filed: Aug. 26, 2004

(65) Prior Publication Data

US 2005/0082431 A1    Apr. 21, 2005

Related U.S. Application Data

(60) Provisional application No. 60/513,486, filed on Oct. 21, 2003.

(51) Int. Cl.
*B64C 1/06* (2006.01)

(52) U.S. Cl. .................. 244/117 R; 244/119; 244/131; 296/146.7; 296/146.15; 52/544

(58) Field of Classification Search ............ 244/117 R, 244/119, 118.1, 118.5, 132, 131; 52/511; 24/450; 296/39.1, 146.15, 214, 146.7
See application file for complete search history.

(56) References Cited

U.S. PATENT DOCUMENTS

| | | | |
|---|---|---|---|
| 1,840,216 A | | 1/1932 | Tormo |
| 3,301,513 A | | 1/1967 | Sugaya |
| 3,320,712 A | * | 5/1967 | Rapata ........................ 52/511 |
| 3,505,772 A | * | 4/1970 | Claire et al. ................... 52/511 |
| 3,808,648 A | * | 5/1974 | Billarant et al. ............... 24/450 |
| 4,896,851 A | | 1/1990 | Shaull |
| 4,923,542 A | * | 5/1990 | Janicki et al. ................. 156/92 |
| 5,797,573 A | | 8/1998 | Nasu |
| 6,196,607 B1 | * | 3/2001 | Gulisano .................... 296/39.1 |
| 6,378,931 B1 | * | 4/2002 | Kolluri et al. .......... 296/146.15 |
| 6,398,295 B1 | * | 6/2002 | Asai ........................... 296/214 |
| 6,616,216 B1 | * | 9/2003 | Furuyama et al. ........ 296/146.7 |

OTHER PUBLICATIONS

Panduit, The World Leader in Network and Eletrical Solutions, Product Information for Tie Plates; http://www.panduit.com/products; [accessed Oct. 15, 2003] (2 pgs).

* cited by examiner

Primary Examiner—Galen Barefoot
(74) Attorney, Agent, or Firm—Perkins Coie LLP

(57) ABSTRACT

Aircraft frames having multiple bracket mounting holes, corresponding brackets, and associated methods are disclosed. An aircraft frame member in accordance with one embodiment of the invention includes multiple sets of mounting holes, each set having one or more mounting holes. Brackets in accordance with an embodiment of the invention can be attached to either of at least two of the sets of mounting holes, for example, using snap fit attachment devices or other attachment devices. Each bracket can support one or more components (e.g., insulation, wiring, ECS ducting) relative to the aircraft frame member. The bracket can also span between two or more aircraft frame members. Each bracket can be installed in any of a variety of positions without the use of tools and can support any of a variety of devices. Accordingly, the time and cost associated with manufacturing, inventorying, installing and repositioning the brackets and the devices they support can be reduced.

57 Claims, 7 Drawing Sheets

AIRCRAFT FRAME HOLE PATTERNS AND BRACKETS, AND ASSOCIATED METHODS

CROSS-REFERENCE TO RELATED APPLICATION

The present application claims priority to U.S. Provisional Application No. 60/513,486, filed Oct. 21, 2003 and incorporated herein in its entirety by reference.

TECHNICAL FIELD

The present invention is directed generally toward aircraft frame hole patterns and corresponding brackets, as well as associated methods.

BACKGROUND

Current commercial aircraft fuselages typically include a frame having circumferentially extending ribs and longitudinally extending stringers. External panels are attached to the outside of the frame and internal panels are attached to the inside of the frame. The frame also supports other components between the external and internal panels, for example, environmental control system (ECS) ducting, wiring, and insulation.

FIGS. 1A–1B illustrate an aircraft rib 10 and a bracket 20 attached to the rib 10 to support an internal fuselage panel (not shown). The bracket 20 is fastened to the isolators 22 with screws 26 and washers 25. Isolaters 22 are attached to the rib 10 with rivets 23 and are positioned between the rib 10 and the bracket 20 to provide noise and thermal isolation between the rib 10 and the internal panel. The bracket 20 also includes slots 21 which support nut clips 24. The nut clips 24 can be moved within the slots 21 for alignment with corresponding holes in the internal panel. The internal panel is then attached to the nut clips 24 with threaded fasteners.

One drawback with the arrangement shown in FIGS. 1A–1B is that providing and installing the bracket 20 can be a costly, labor-intensive process. For example, different locations within the aircraft require different brackets, so the manufacturer must typically stock a multitude of different bracket types, and ensure that the correct bracket is used at each location. Each bracket 20 must typically be custom-installed in place on the rib 10 after the rib 10 has been installed on the airframe and before the rib 10 has been drilled to receive the isolator 22. Accordingly, the manufacturer must typically locate each isolator 22 relative to the rib 10 using tooling or hand measurements, clamp the isolator 22 to the rib 10, drill pilot holes and full size holes with hand-held power tools, ream the holes, and then attach the isolators 22 to the ribs 10, again using hand-held manual or power tools to install rivets, Hi-Lok® fasteners, or screws. Then bracket 20 is located using tooling or hand measurements, and fastened with screws 26 and washers 25.

SUMMARY

The present invention is directed generally toward aircraft structural system, and associated methods. An arrangement in accordance with one aspect of the invention includes at least one aircraft frame member having a plurality of mounting holes arranged in a plurality of mounting hole sets, with each mounting hole set having at least one mounting hole. The arrangement can further include a bracket having at least one attachment element configured to be received in the at least one mounting hole of either of at least two of the mounting hole sets to secure the bracket to the at least one frame member without the use of tools. The attachment element can include a column and a plurality of flexible snap elements depending from the column. The aircraft frame member can include a flange section and a web section, and the bracket can include a generally flat web mount portion positioned against the flange section of the at least one aircraft frame member, and a flange clip hooked around the flange section of the at least one aircraft frame member. In still further aspects of the invention, the bracket can be attached between to two spaced-apart frame members.

A bracket for supporting structures in accordance with another aspect of the invention can include a first and second generally identical bracket members each having a first surface and a second surface facing opposite the first surface, an aperture extending from the first surface to the second surface, and at least one attachment member extending away from the first surface proximate to the aperture, with the at least one attachment member having an engagement portion. The aperture of the first bracket member is sized to removably receive the at least one attachment member of the second bracket member with the engagement portion of the attachment member engaged with the second surface of the first bracket member. The aperture of the second bracket member is sized to removably receive the at least one attachment member of the first bracket member with the engagement portion of the first attachment member engaged with the second surface of the second bracket member.

A method in accordance with another embodiment of the invention includes providing in at least one aircraft frame member having a plurality of mounting holes automatically formed therein, with the mounting holes being arranged in a plurality of mounting hole sets, and with each mounting hole set having at least one mounting hole. The method can further include subsequently connecting the at least one aircraft frame member to other aircraft frame members, and inserting at least one attachment element of a bracket into the at least one mounting hole of at least one of the mounting hole sets to secure the bracket to the at least one aircraft frame member without the use of tools. The at least one attachment element can be configured to be received by at least one mounting hole of any of at least two of the mounting hole sets. The method can still further include attaching an aircraft component to the bracket.

DETAILED DESCRIPTION

The following disclosure describes support brackets and corresponding hole patterns in aircraft frames. Embodiments of the hole patterns and brackets can significantly reduce the cost and effort associated with aircraft assembly. Certain specific details are set forth in the following description and FIGS. 2–12 to provide a thorough understanding of various embodiments of the invention. Certain well-known details often associated with aircraft are not set forth in the following disclosure, however, to avoid unnecessarily obscuring the various embodiments of the invention. Those of ordinary skill in the relevant art will understand that they can practice other embodiments of the invention without several of the details described below.

Figure 2:
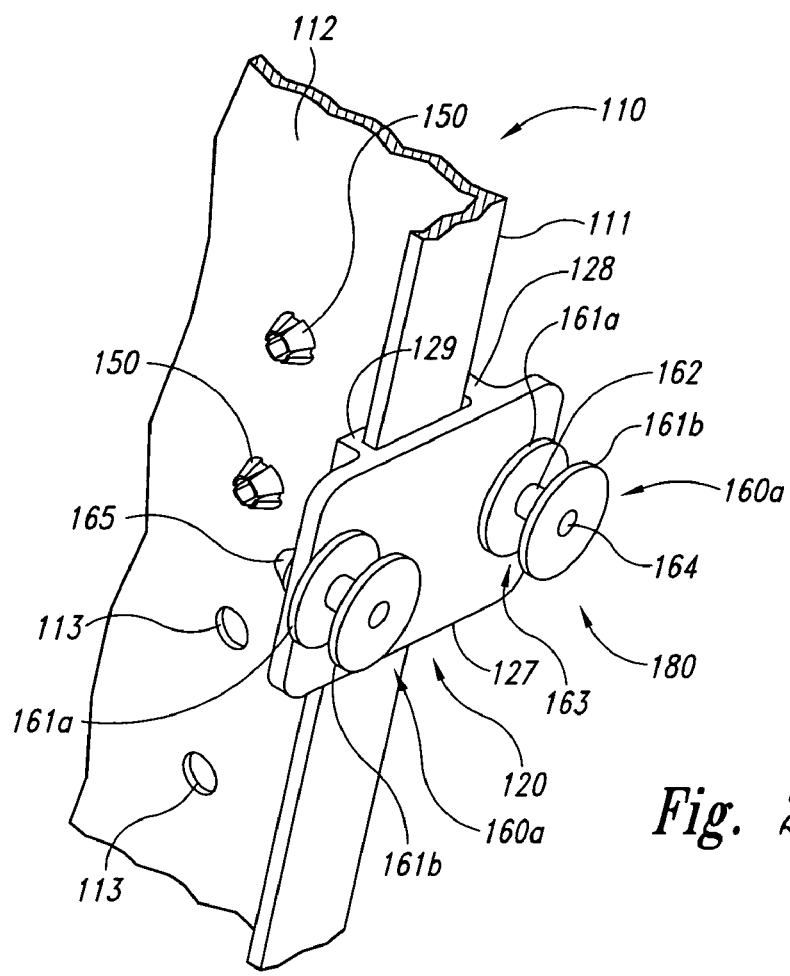
FIG. 2 is an isometric illustration of a bracket attached to a frame member in accordance with an embodiment of the invention.

FIG. 2 is an isometric illustration of a bracket 120 attached to a frame member 110 in accordance with an embodiment of the invention. The frame member 110 can include a circumferentially extending rib (as shown in FIG. 2) or a longitudinally extending stringer. The frame member 110 can have a generally L-shaped cross-section, with a web 112 carrying a flange 111. The web 112 includes a plurality of spaced-apart mounting holes 113 to which the bracket 120 is attached. The portion of the frame member 110 shown in FIG. 2 has four mounting holes 113, two of which are occupied by the bracket 120 and two of which are available for re-positioning the bracket 120, or receiving another bracket 120. Accordingly, the mounting holes 113 are arranged in sets, with each set configured to carry the bracket 120. In an embodiment shown in FIG. 2, each set has two mounting holes 113 and in other embodiments, each set can have more or fewer holes, depending on the configuration of the bracket or brackets 120 the mounting holes 113 are configured to support.

In one aspect of an embodiment shown in FIG. 2, the bracket 120 includes two bracket attach devices 150, each of which is received in one of the mounting holes 113. The frame member 110 can accordingly include a multitude of pairs of mounting holes 113 with each pair being configured to receive a corresponding pair of the bracket attach devices 150. For example, the frame member 110 can include significantly more mounting holes 113 than are required to install the bracket 120 in a given aircraft configuration. In a particular embodiment, the frame member 110 (and/or the entire aircraft in which the frame member 110 is positioned) can include about 25% more mounting holes 113 than are necessary to support brackets for a given aircraft configuration. In other embodiments, the frame member 110 and/or the aircraft can include more or fewer excess holes. As a result, similar frame members 110 installed on different aircraft configurations can have different mounting holes 113 (or sets of mounting holes 113) that are "extra," e.g., that are unoccupied by a bracket 120.

An advantage of the foregoing feature is that the same frame member 110 can be used for different aircraft configurations without custom drilling the mounting holes 113 to support different mounting locations for the bracket 120. This arrangement can significantly reduce the cost associated with mounting the brackets 120 to the frame member 110 at different locations that may depend upon the particular aircraft configuration. Another advantage of this arrangement is that an aircraft having brackets 120 attached in a particular configuration can be easily changed over to another configuration by removing the brackets 120 and reattaching them to different sets of mounting holes 113. The ability to provide a frame member 110 that supports multiple aircraft configurations can accordingly reduce the cost of initially manufacturing the aircraft, and/or subsequently retrofitting the aircraft, and/or making engineering changes prior to or during the manufacture of the aircraft.

Figure 1A:
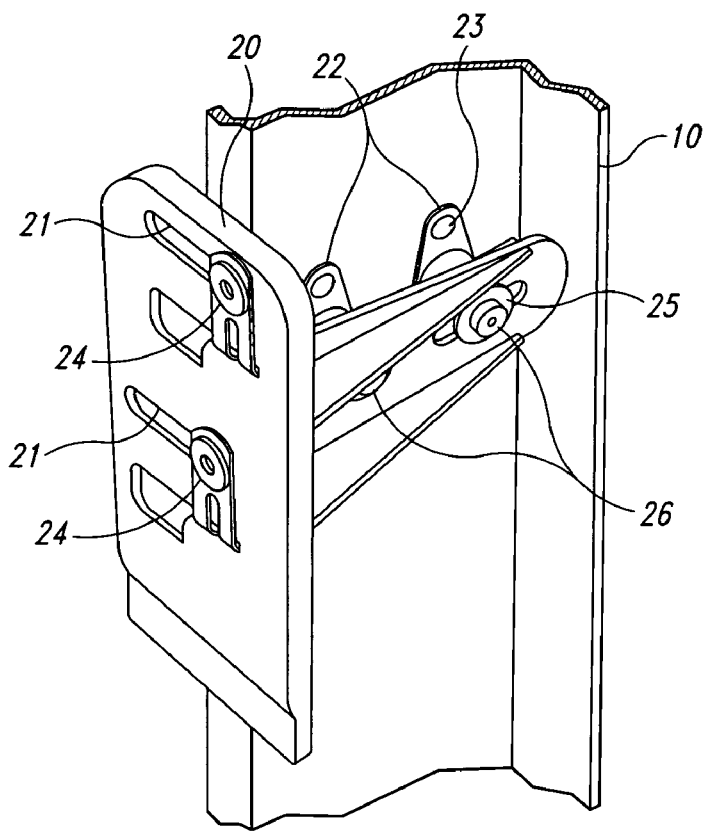
FIGS. 1A–1B are isometric illustrations of brackets attached to aircraft ribs in accordance with the prior art.
Figure 1B:
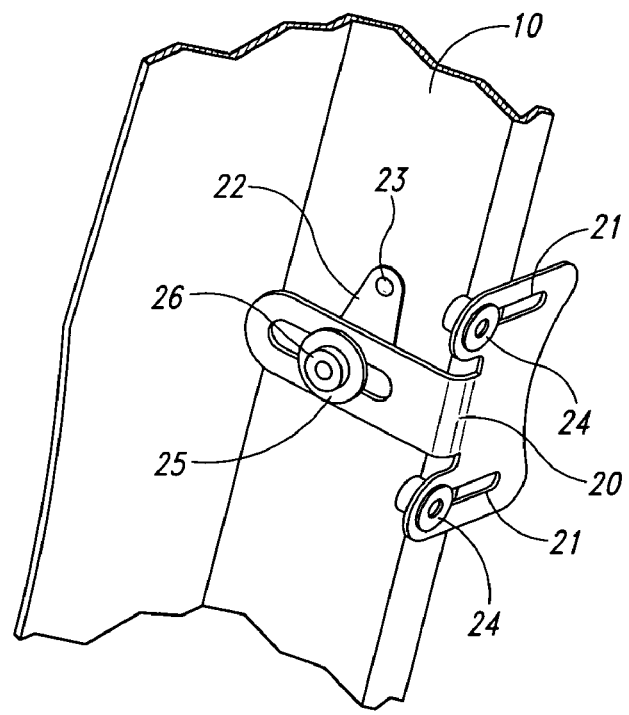

In another aspect of an embodiment shown in FIG. 2, the frame member 110 includes a composite material, for example, a graphite composite. In other embodiments, the frame member 110 can include other materials, for example, aluminum. When the frame member 110 includes a composite material, the manner in which the mounting holes 113 are installed in the frame member 110 can produce additional advantages. For example, composite frame members 110 are typically set up on a numerically controlled (NC) machine to automatically remove flash from the frame member 110 prior to installing the frame member 110 on the aircraft. While the frame member 110 is set up on the NC machine for the flash trimming operation, the mounting holes 113 can be automatically and precisely drilled in the frame member 110. This can (a) eliminate the need to clamp each bracket 120 to the frame member 110 to locate the mounting holes 113, (b) eliminate the time required to hand drill the mounting holes 113, and (c) eliminate the need for the locating slots 21 described above with reference to FIGS. 1A and 1B.

Still another feature of the foregoing arrangement is that the susceptibility of the composite web 112 to fatigue cracks typically does not increase as a result of drilling the mounting holes 113. This can be due to the fact that the composite material is inherently less susceptible to fatigue cracks, and the fact that the web 112 is generally thicker than would be a corresponding aluminum web sized to carry the same load. An advantage of this feature is that the unused mounting holes 113 reduce the weight of the frame member 110 (and therefore the operating costs of the aircraft in which the frame member 110 is installed), without increasing the likelihood for fatigue cracks. A further advantage is that, unlike holes in aluminum structures, the mounting holes 113 in a composite frame member 110 need not be filled (e.g., with a metal fastener, such as a screw or rivet) when mounting the bracket 120. This can simplify the bracket 120 and the methods employed to install the bracket 120.

The bracket 120 can include a web mount portion 128 that abuts against the web 112 of the frame member 110, and a flange mount portion 127 having a flange clip 129 that clips around the edge of the flange 111. The bracket 120 can be made from a flexible material, such as an injection molded thermoplastic or Nylon®, and can be installed by first hooking the flange clip 129 around the flange 111, and then inserting the bracket attach devices 150 through the mounting holes 113. Further details of the bracket attach devices 150 are described below with reference to FIG. 3.

The bracket 120 can be configured to carry one or more component supports 180, which in turn support components including wires, ECS ducts or insulation. In a particular embodiment shown in FIG. 2, the bracket 120 carries two flexible, resilient, through-mount grommets 160*a*. Each grommet includes a grommet attach device 165 (for example, a flexible conical head on a shaft) that is inserted into and through a corresponding hole in the bracket 120. The through-mount grommets 160*a* also include two disks 161 (shown as a first disk 161*a* and a second disk 161*b*) mounted on a column 162 and spaced apart from each other by a gap 163. As described below with reference to FIG. 4, the through-mount grommets 160*a* can support a panel of insulation relative to the frame member 110. Each through-mount grommet 160*a* can also include an aperture 164 to which additional component support devices are attached.

Figure 3:
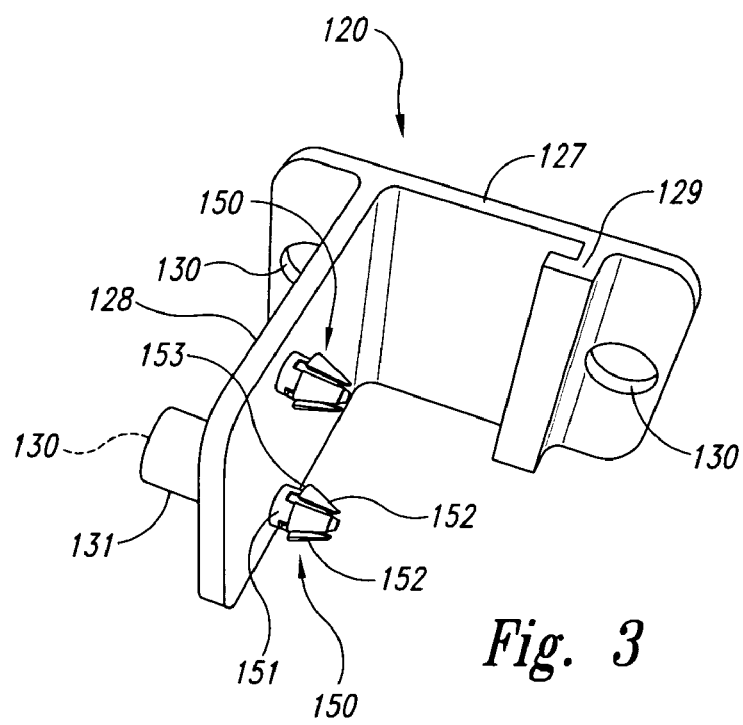
FIG. 3 is an isometric illustration of an embodiment of the bracket shown in FIG. 2.

FIG. 3 is an isometric illustration of an embodiment of the bracket 120 described above with reference to FIG. 2. As shown in FIG. 3, the flange mount portion 127 of the bracket 120 includes support mounting holes 130, each configured to carry a component support 180 (e.g., the through-mount grommets 160*a* described above with reference to FIG. 2). The bracket 120 can also include a support mounting hole 130 positioned in a support mounting boss 131 extending outwardly from the web mount portion 128. The support mounting boss 131 and its associated support mounting hole 130 can carry additional component supports 180.

The web mount portion 128 also carries the bracket attach devices 150. In a particular embodiment, each bracket attach device 150 has a snap-fit configuration and accordingly includes a column 151 that carries snap elements 152. The snap elements 152 are inserted into the mounting holes 113 (FIG. 2) of the frame member 110 (FIG. 2) until engaging surfaces 153 snap into place to secure the bracket 120 relative to the frame member 110, without the need for hand tools or power tools. The bracket 120 can be removed from the frame member 110 by manually squeezing the snap elements 152 together and withdrawing the bracket attach devices 150 from the mounting holes 113, again without the use of tools.

Figure 4:
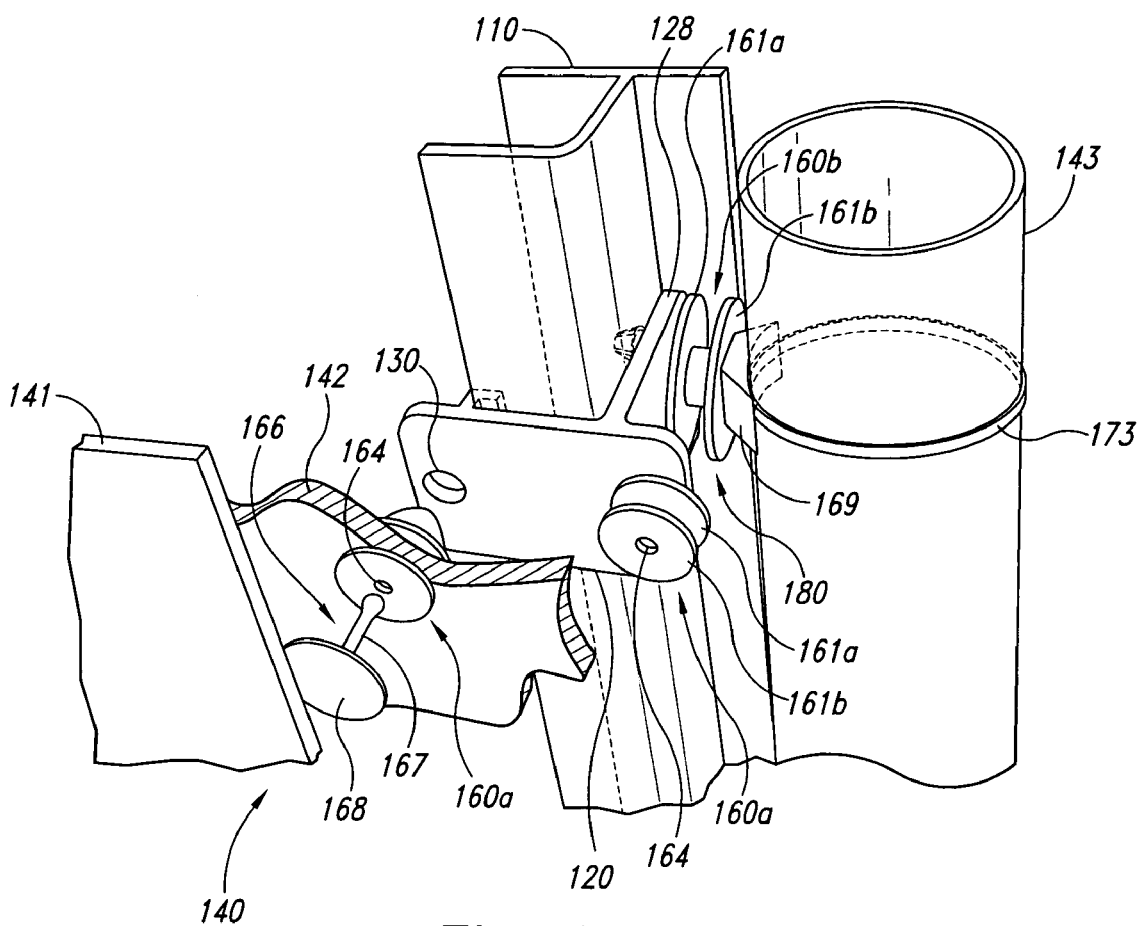
FIG. 4 is an isometric illustration of a bracket attached to a frame member to support a plurality of components in accordance with another embodiment of the invention.

FIG. 4 is an isometric illustration of a bracket 120 generally similar to that described above, attached to a frame member 110 and configured to support a plurality of components 140 in accordance with an embodiment of the invention. The bracket 120 can carry two through-mount grommets 160*a*, which together support a section of insulation 142 relative to the frame member 110. In one embodiment, the through-mount grommets 160*a* are pre-mounted to the insulation section 142 and then inserted into the corresponding support mounting holes 130. In another embodiment, the through-mount grommets 160*a* are first attached to the bracket 120 and then attached to the insulation section 142. This can be accomplished by squeezing the second disk 161*b* of the through-mount grommet 160*a* through a corresponding hole in the insulation section 142 to secure the insulation section 142 to the already installed through-mount grommet 160*a*.

In either of the foregoing embodiments, the first and second disks 161*a*, 161*b* can seal the hole in the insulation section 142. For example, the first and second disks 161*a*, 161*b* can be spaced apart from each other by a distance that is slightly less than the thickness of the insulation section 142, so that the disks 161*a*, 161*b* are sealably pressed against the insulation section 142. An advantage of this arrangement is that the hole in the insulation section 142 need not be sealed in a separate process, thereby reducing the time required to properly install the insulation section 142. The disks 161*a*, 161*b* (and the other portions of the through-mount grommet 160*a*) can also provide thermal and vibration isolation between the insulation section 142 and the frame member 110.

Each through-mount grommet 160*a* can also support additional components. For example, in an embodiment shown in FIG. 4, each through-mount grommet 160*a* has an aperture 164 that receives a corresponding sidewall clip 166. The sidewall clip 166 is attached to a sidewall section 141. In a particular embodiment, each sidewall clip 166 includes a disk 168, which is adhesively attached to the sidewall section 141. A shaft 167 extends away from the disk 168 and is inserted into the aperture 164 of the through-mount grommet 160*a* to secure both the sidewall clip 166 and the sidewall section 141 relative to the frame member 110.

The bracket 120 can also support a flush-mount grommet 160*b*. The flush-mount grommet 160*b* fits around the support mounting boss 131 (FIG. 3), which extends outwardly away from the web mount portion 128. The flush-mount grommet 160*b* includes first and second disks 161*a*, 161*b*, that engage opposing surfaces of a corresponding insulation section (not shown in FIG. 4). The support mounting boss 131 can include a support mounting hole 130 (FIG. 3) that can receive additional component supports 180. In an embodiment shown in FIG. 4, the support mounting boss 130 receives a hose saddle 169 which is shaped to engage a hose or conduit 143 (for example, an ECS conduit). The hose 143 can be secured to the hose saddle 169 with a zip tie 173 or other suitable device (e.g., an adhesive).

Figure 5:
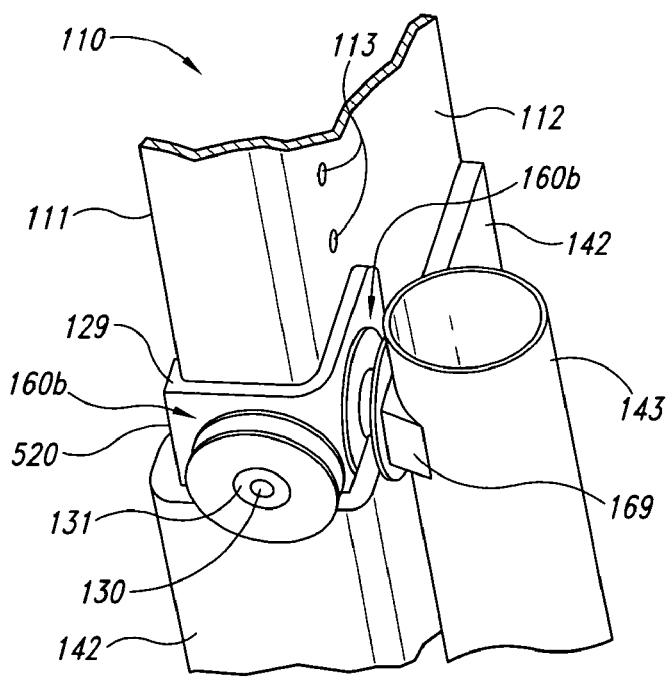
FIG. 5 is an isometric illustration of a bracket attached to a frame member to support components in accordance with yet another embodiment of the invention.

FIG. 5 illustrates a bracket 520 configured in accordance with another embodiment of the invention. The bracket 520 includes two bosses 131 (one of which is visible in FIG. 5), each of which supports a flush-mount grommet 160*b*. The flush-mount grommets 160*b* together support an insulation section 142 (which has been partially cut away in FIG. 5 for purposes of illustration). Each boss 131 can also carry an additional component support, for example, the hose saddle 169 shown in FIG. 5. The bracket 520 has a flange clip 129 that engages the flange 111 of the frame member 110, and a bracket attachment device (not visible in FIG. 5) that is received in one of the mounting holes 113.

Figure 6A:
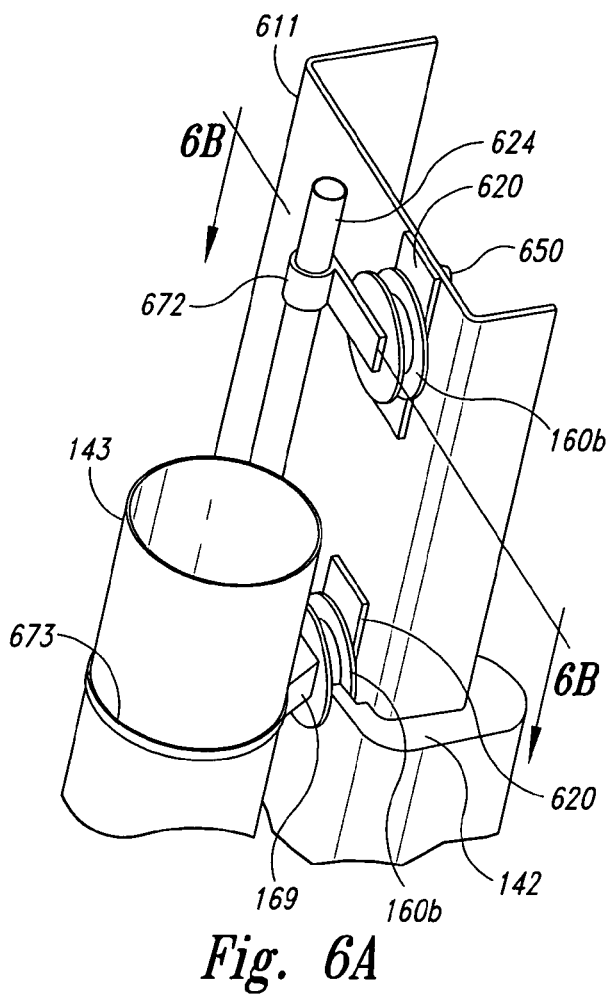
FIG. 6A is an isometric illustration of a bracket attached to a frame member to support a plurality of components in accordance with still another embodiment of the invention.
Figure 6B:
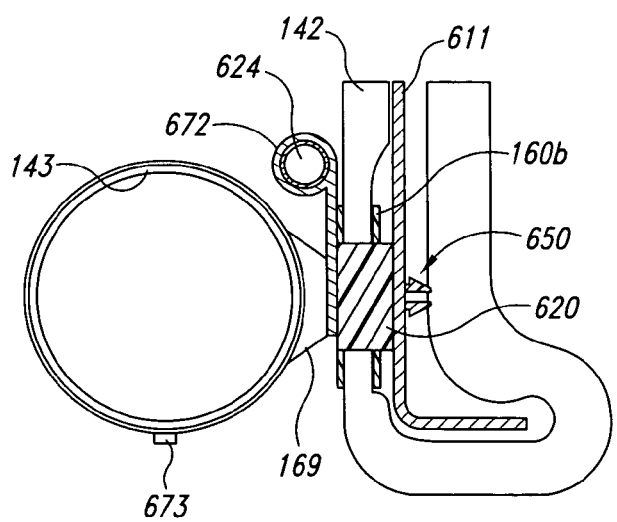
FIG. 6B is a cross-sectional illustration of the bracket and frame member shown in FIG. 6A, taken substantially along line 6B—6B of FIG. 6A.

FIG. 6A is an isometric illustration of a frame 611 carrying a plurality of brackets 620 in accordance with another embodiment of the invention. FIG. 6B is a cross-sectional view of the frame 611, taken substantially along line 6B—6B of FIG. 6A. Referring to FIGS. 6A and 6B together, each bracket 620 engages a single surface of the frame 611 and includes a pair of bracket attach devices 650 (one of which is visible in FIGS. 6A–6B). Each bracket 620 can support a flush-mount grommet 160*b* which in turn carries an insulation section 142. One of the flush-mount grommets 160*b* also carries a hose saddle 169 having a zip tie 673 to which a hose 143 is attached. Another of the flush-mount grommets 160*b* carries a clip 672 which in turn carries a wire, wire bundle or other tubular structure 624.

Figure 7:
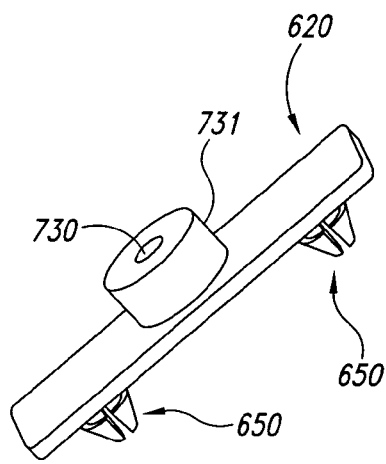
FIG. 7 is an isometric illustration of an embodiment of the bracket shown in FIGS. 6A–6B.

FIG. 7 is an isometric illustration of the bracket 620 described above with reference to FIGS. 6A–6B. The bracket 620 includes a boss 731 (which carries the flush mount grommet 160*b*, FIGS. 6A–6B) and a support mounting hole 730 (which carries other support structures, e.g., the hose saddle 169 and the clip 672, FIGS. 6A–6B). The bracket attach devices 650 can have a snap-fit configuration, generally similar to that described above with reference to FIG. 3.

Figure 8:
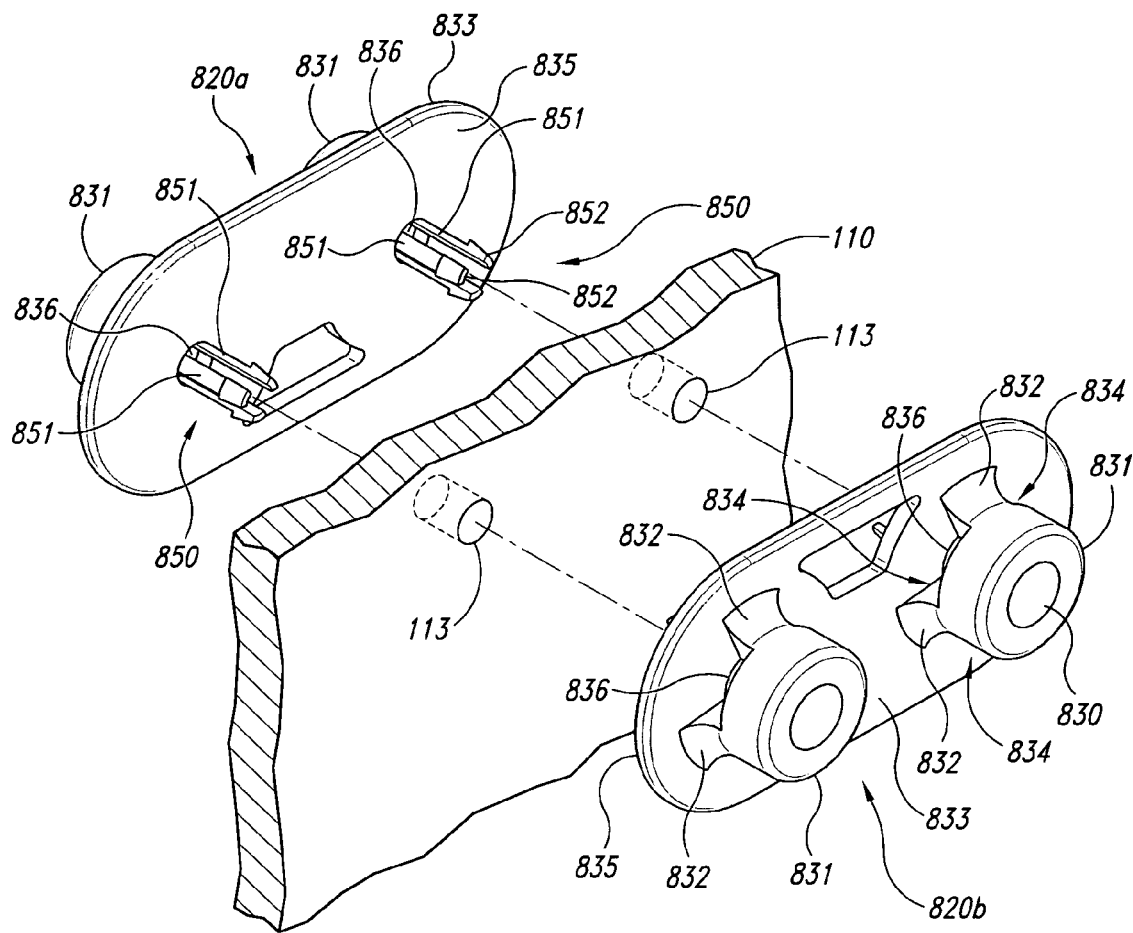
FIG. 8 is a partially schematic, isometric illustration of a pair of brackets that attach to each other from opposite sides of a frame member in accordance with yet another embodiment of the invention.

FIG. 8 is a partially schematic illustration of a pair of brackets or bracket members 820 (shown as a first bracket 820*a* and a second bracket 820*b*), each of which is attached to the other through the mounting holes 113 in the frame member 110. In one aspect of this embodiment, each bracket 820 includes two bracket attachment devices 850. Each bracket attachment device 850 includes a plurality of columns 851 (for example, three columns) and a snap element or engagement portion 852 at the end of each column 851. Each bracket 850 further includes a boss 831 having a support mounting hole 830 and being configured to carry insulation and/or other structures. Each boss 831 is supported relative to the bracket 850 by offset legs 832. Accordingly, each boss 831 is spaced apart from an outwardly facing surface 833 of the bracket 850 by three gaps 834, which also separate neighboring offset legs 832 from each other. An additional aperture 836 extends through the bracket 820 from the outwardly facing surface 833 to an inwardly facing surface 835.

During installation, the first bracket 820a is installed by inserting the corresponding bracket attach devices 850 into and through the mounting holes 113 from one side of the frame member 110. The second bracket 820b is then inverted relative to the first bracket 820a and its attachment devices 850 are inserted into and through the mounting holes 113 from the opposite side of the frame member 110. The snap elements 852 of each bracket 820 are inserted into and through the aperture 836 of the other bracket 820 and snap into the gaps 834 of the other bracket 820 to secure the brackets 820 to each other and to the frame member 110. Accordingly, the snap elements 852 of each bracket 820 engage the outwardly facing surface 833 of the other bracket 820. Components can then be secured to the frame member 110 from either (or both) sides of the frame member 110 by attaching them to the appropriate bracket(s) 820.

Figure 9:
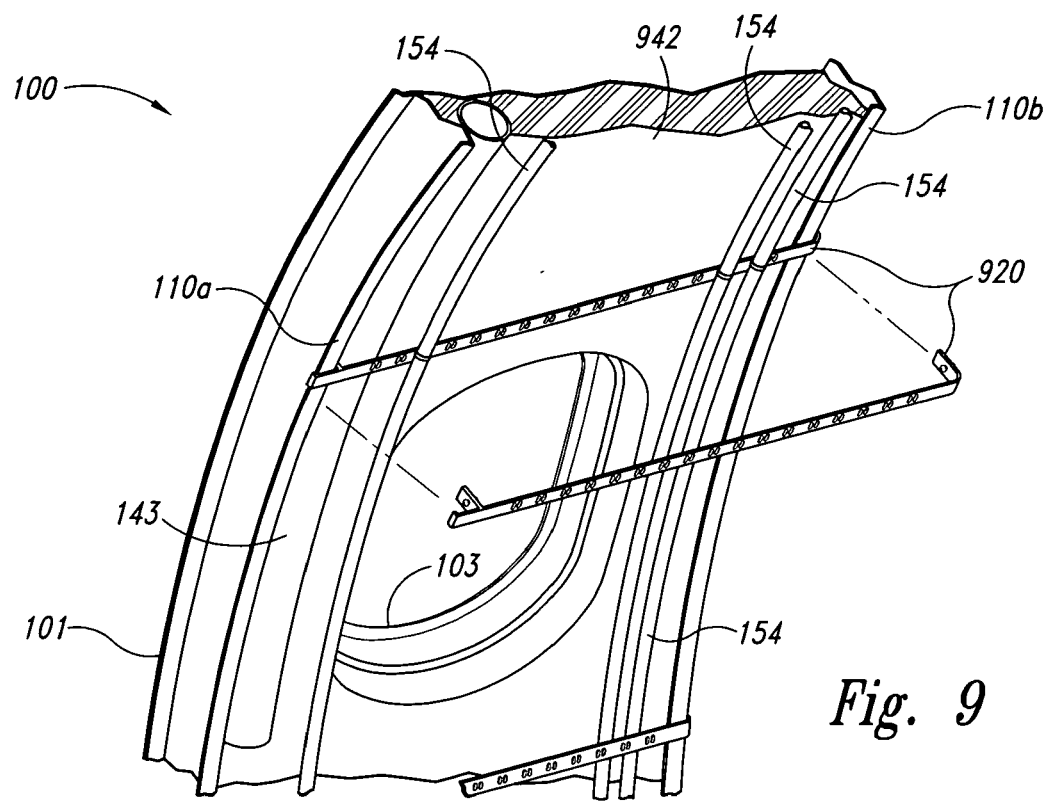
FIG. 9 is an isometric illustration of a bracket that spans between two spaced-apart frame members in accordance with still another embodiment of the invention.
Figure 10:
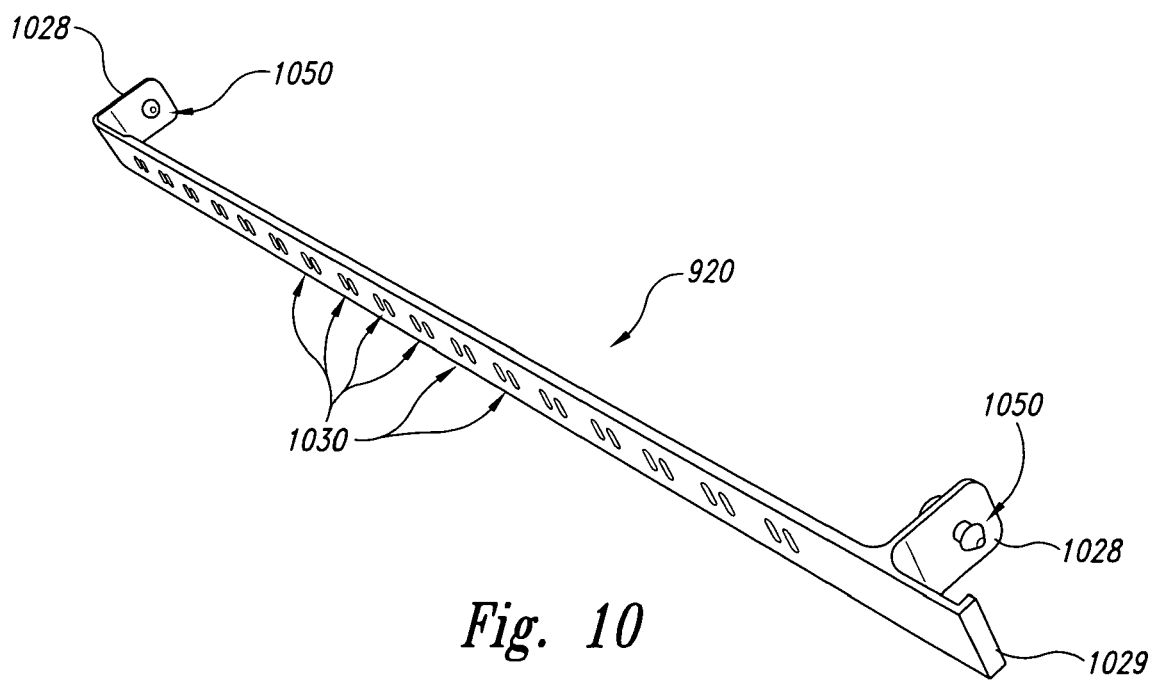
FIG. 10 is an isometric illustration of an embodiment of the bracket shown in FIG. 9.
Figure 11:
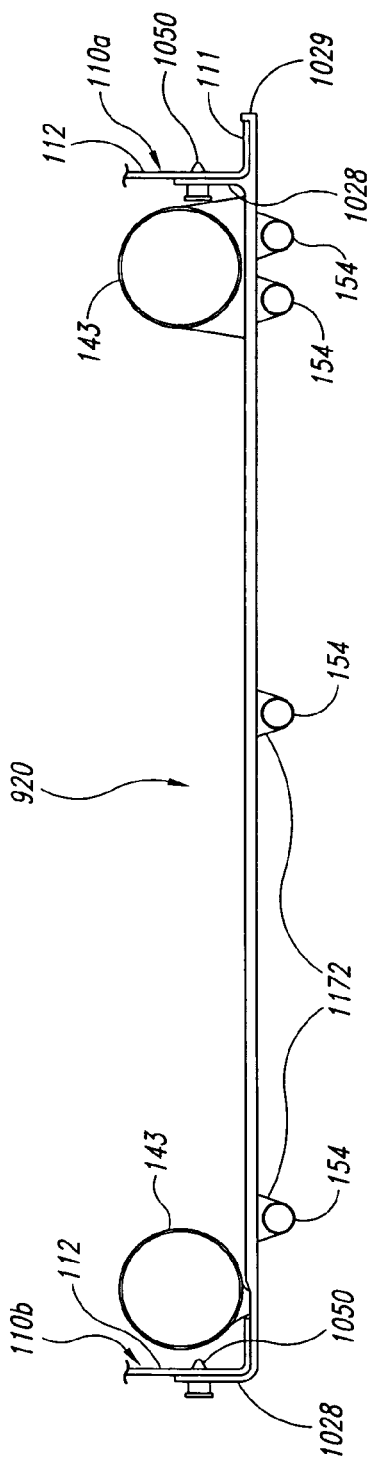
FIG. 11 is a top plan view of an embodiment of the bracket shown in FIGS. 9 and 10.

FIGS. 9–11 illustrate a bracket 920 attached to multiple frame members in accordance with another embodiment of the invention. Beginning with FIG. 9, an aircraft 100 includes a fuselage 101 having a plurality of spaced-apart frame members 110 (two are shown in FIG. 9 as a first frame member 110a and a second frame member 110b). An external panel 103 is attached to the exterior surfaces of the frame members 110, and an internal panel (not shown in FIG. 9) is attached to the interior surfaces of the frame members 110. An insulation section 942 is positioned between the frame members 110 and between the external panel 103 and the internal panel. The bracket 920 (which is shown in both a detached position and an attached position) attaches to the frame members 110 using an arrangement generally similar to that described above with reference to FIGS. 2–8, and can support one or more supported components 140, for example, an ECS duct 143 and wiring 154.

Referring next to FIG. 10, the bracket 920 can include a flange clip 1029 which attaches to the flange of one of the frame members 110 described above, and two opposing web mount portions 1028, each of which attaches to a web of one of the frame members 110. Each web mount portion 1028 carries a bracket attachment device 1050, configured in a manner generally similar to that described above with reference to FIG. 3. The bracket 920 also includes a plurality of support mounting holes or slots 1030 positioned in an elongated portion of the bracket 920 between the flange clip 1029 and one of the web mount portions 1028. Each of the mounting holes or slots 1030 (or each set of mounting holes or slots) is configured to carry a component support. The plurality of support mounting holes or slots 1030 allows the bracket 920 to support components in any of a variety of positions. Accordingly, a single style of bracket 920 can be used in a variety of different types of aircraft and/or aircraft configurations, and/or can support a simplified retrofit of an aircraft.

FIG. 11 is a cross-sectional view looking downwardly on the bracket 920 installed between the frame members 110a, 110b (with the left/right orientation of FIG. 11 inverted from FIG. 9). The flange clip 1029 of the bracket 920 clips around the flange 111 of the first frame member 110a. The web mount portions 1028 each engage a web 112 of one of the frame members 110a, 110b. The bracket 920 carries clips 1172, for example, cable ties and tie plates available from the Panduit Corporation of Tinley Park, Ill. The clips 1172 support the ECS ducts 143 and wiring 154. In other embodiments, the bracket 920 can include other arrangements for supporting components.

Figure 12:
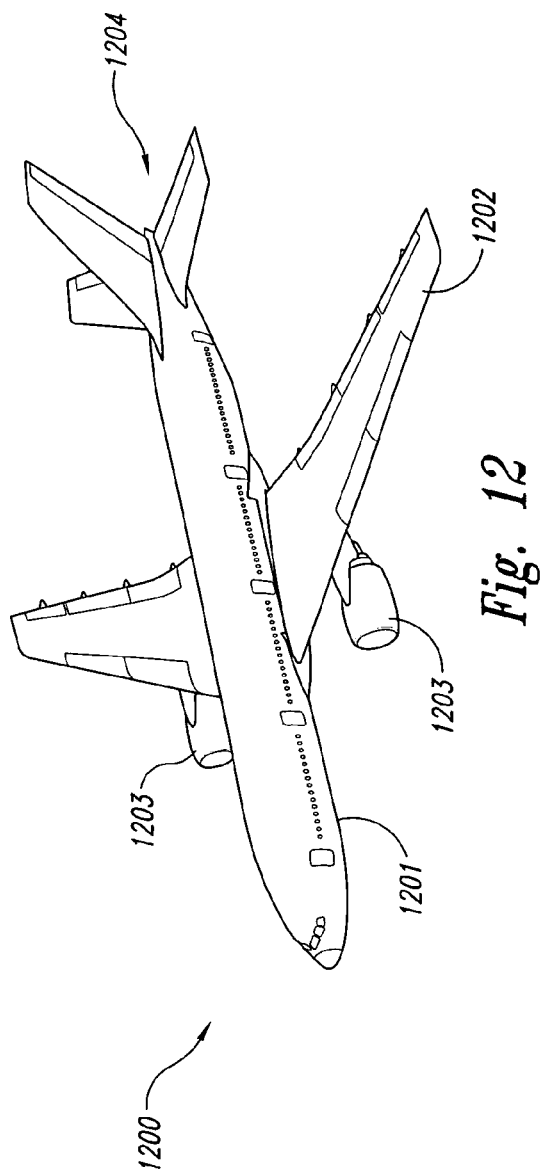
FIG. 12 is an isometric illustration of an aircraft on which brackets are installed in accordance with further embodiments of the invention.

The brackets described above with reference to FIGS. 1–11 can be used in the construction of a variety of vehicles, for example, an aircraft 1200 shown in FIG. 12. The aircraft 1200 can include a wing 1202 attached to a fuselage 1201 having an empennage 1204. The aircraft 1200 can further include one or more engines 1203 attached to the wing 1202 or another portion of the aircraft 1200. Any of the above aircraft structures can include frame members and brackets coupled together in the manners described above and positioned to support other aircraft components. In other embodiments, the frame members and brackets can be incorporated into other vehicles and/or other structures.

One feature of embodiments of the brackets described above with reference to FIGS. 2–12 is that they can include a snap-fit arrangement for coupling to the aircraft frame member. An advantage of this feature is that the brackets can be easily removed and repositioned, for example, when the layout or interior configuration of the aircraft is altered. Other features of brackets in accordance with embodiments of the invention are that they can be installed at any of a variety of locations on the frame members, and can carry any of a variety of component supports (e.g., for supporting wiring, insulation, ECS ducts and other devices). An advantage of these features is that the same type of bracket can be used in multiple locations to support different types of devices. Accordingly, the number of different types of brackets that must be manufactured, inventoried, tracked and installed during the production of aircraft having one or more configurations can be reduced, thereby reducing the cost of producing the aircraft.

Still a further feature of embodiments of the brackets described above is that they can be installed and removed without the use of tools. For example, the brackets can include flexible snap-fit features. An advantage of this arrangement is that it can significantly reduce the amount of time and effort required to install and/or remove the brackets. Accordingly, the cost of manufacturing and/or retrofitting an aircraft can be significantly reduced when compared with existing methods.

From the foregoing, it will be appreciated that specific embodiments of the invention have been described herein for purposes of illustration, but that various modifications may be made without deviating from the spirit and scope of the invention. For example, the frame members described above as having L-shaped cross-sections in some embodiments, can have other cross-sectional shapes in other embodiments. Features described in the context of particular embodiments can be combined or eliminated in other embodiments. Accordingly, the invention is not limited except as by the appended claims.

We claim:

1. An aircraft structural arrangement, comprising:
   at least one aircraft frame member having a plurality of mounting holes arranged in a plurality of mounting hole sets, each mounting hole set having at least one mounting hole; and
   a bracket having at least one attachment element configured to be received in the at least one mounting hole of either of at least two of the mounting hole sets to secure the bracket to the at least one frame member without the use of tools, the bracket being secured to the at least one frame member with the at least one attachment element received in the at least one mounting hole while at least some of the mounting hole sets are unoccupied by another bracket.

2. The aircraft structural arrangement of claim 1, further comprising a support depending from the bracket, the support being configured to carry an aircraft component relative to the at least one aircraft frame member.

3. The aircraft structural arrangement of claim 1 wherein each mounting hole set includes one or more mounting holes.

4. The aircraft structural arrangement of claim 1 wherein the at least one attachment element includes a column and a plurality of flexible snap elements depending from the column.

5. The aircraft structural arrangement of claim 1 wherein the at least one aircraft frame member has a composite construction.

6. The aircraft structural arrangement of claim 1 wherein the at least one aircraft frame member includes a first aircraft frame member of a first aircraft, the first aircraft frame member having at least a first mounting hole set unoccupied by a bracket, and wherein the bracket includes a first bracket, and wherein the structural arrangement further comprises:
a second aircraft frame member of a second aircraft, the second aircraft frame member being generally identical to the first aircraft frame member and having a plurality of mounting holes arranged in a plurality of mounting hole sets, each mounting hole set having at least one mounting hole, the second aircraft frame member having at least a second mounting hole set unoccupied by a bracket, the second mounting hole set having a different position relative to the second aircraft frame member than the first mounting hole set has to the first aircraft frame member; and
a second bracket having at least one attachment element received in the at least one mounting hole of the second aircraft frame member to secure the second bracket to the second frame member.

7. The aircraft structural arrangement of claim 1 wherein the at least one aircraft frame member includes a flange section and a web section, and wherein the bracket includes a generally flat web mount portion positioned against the web section of the at least one aircraft frame member and wherein the bracket includes a flange clip hooked around the flange section of the at least one aircraft frame member.

8. The aircraft structural arrangement of claim 1 wherein the at least one aircraft frame member includes a flange section and a web section, and wherein the bracket includes a generally flat web mount portion positioned against the web section of the at least one aircraft frame member and wherein the bracket includes a flange clip hooked around the flange section of the at least one aircraft frame member, further wherein the at least one attachment element depends from the web mount portion of the bracket.

9. The aircraft structural arrangement of claim 1, further comprising a support coupled to the bracket, and wherein the support includes a grommet having a hole positioned to receive additional attachment components.

10. The aircraft structural arrangement of claim 1, further comprising a support coupled to the bracket, and wherein the support includes a grommet having two disks spaced apart by a gap, the gap being positioned to receive a panel.

11. The aircraft structural arrangement of claim 1 wherein the at least one aircraft frame member includes first and second spaced apart aircraft frame members, and wherein the bracket is attached to both the first aircraft frame member and the second aircraft frame member.

12. The aircraft structural arrangement of claim 1 wherein the at least one aircraft frame member includes first and second spaced apart aircraft frame members, each having a flange section and a web section, and wherein the bracket includes a generally flat web mount portion positioned against the web section of the first aircraft frame member and a flange clip hooked around the flange section of the second aircraft frame member.

13. An aircraft structural arrangement, comprising:
at least one aircraft frame member having a plurality of mounting holes arranged in a plurality of mounting hole sets, each mounting hole set having at least one mounting hole, the frame member having a flange section and a web section; and
a bracket having at least one attachment element configured to be received in the at least one mounting hole of either of at least two of the mounting hole sets to secure the bracket to the at least one frame member without the use of tools, the bracket having a generally flat web mount portion positioned against the web section of the at least one aircraft frame member and a flange clip hooked around the flange section of the at least one aircraft frame member and facing toward the web mount portion.

14. An aircraft, comprising:
at least one aircraft frame member having a plurality of mounting holes arranged in a plurality of mounting hole sets, each mounting hole set having at least one mounting hole, the at least one aircraft frame member further having a flange section and a web section;
a bracket that includes:
a web mount portion having a generally flat web mount surface positioned against the web section of the at least one aircraft frame member;
a flange mount portion coupled to the web mount portion, the flange mount portion having a generally flat flange mount surface positioned against the flange section of the at least one aircraft frame member, the flange mount portion further having a flange clip that is spaced apart from the flange mount surface, faces toward the web mount portion, and is hooked around an edge of the flange section; and
at least one attachment element configured to be received by the at least one mounting hole of either of at least two of the mounting hole sets without the use of tools; and
a support depending from the bracket, the support being configured to carry an aircraft component relative to the at least one aircraft frame member.

15. The aircraft of claim 14, further comprising an insulation panel carried by the support.

16. The aircraft of claim 14, further comprising an insulation panel and an aircraft interior sidewall panel carried by the support.

17. The aircraft of claim 14 wherein the at least one aircraft frame member includes a plurality of aircraft frame members, and wherein the aircraft further comprises:
a fuselage that includes a plurality of fuselage panels coupled to the frame members;
a wing depending from the fuselage; and
a propulsion system depending from at least one of the wing and the fuselage.

18. The aircraft of claim 14 wherein the at least one attachment element includes a column and a plurality of flexible snap elements depending from the column.

19. The aircraft of claim 14 wherein at least some of the mounting hole sets are unoccupied by a bracket.

20. The aircraft of claim 14 wherein the support includes a grommet having a hole positioned to receive additional attachment components.

21. The aircraft of claim 14 wherein the support includes a grommet having two spaced apart disk portions, and wherein the aircraft further comprises a panel sealably contacting the two disk portions.

22. The aircraft of claim 14 wherein the support includes a grommet having two disks spaced apart by a gap, the gap being positioned to receive a panel.

23. The aircraft of claim 14, further comprising the component, and wherein the component includes at least one of a panel, a wire and a duct.

24. A bracket for supporting structures, comprising:
a web mount portion having a generally flat web mount surface positioned to abut against a web section of a first aircraft frame member;
a flange mount portion coupled to the web mount portion, the flange mount portion having a generally flat flange mount surface positioned to abut against a flange section of the first or a second aircraft frame member, the flange mount portion further having a flange clip that is spaced apart from the flange mount surface, faces toward the web mount portion, and is positioned to hook around an edge of the flange section; and
at least one attachment element configured to be received in a mounting hole of the first or second aircraft frame member.

25. The bracket of claim 24 wherein the at least one attachment element is configured to be attached to the first or second aircraft frame member without the use of tools.

26. The bracket of claim 24, further comprising a support attached at least proximate to at least one of the web mount portion and the flange mount portion, the support being configured to carry an aircraft component.

27. The bracket of claim 24, further comprising an elongated portion positioned between the web mount portion and the flange mount portion, with the web mount portion and the flange mount portion coupled to each other via the elongated portion.

28. The bracket of claim 24 wherein the at least one attachment element includes a column and a plurality of flexible snap elements depending from the column.

29. The bracket of claim 24, further comprising a support coupled to the bracket, and wherein the support includes a grommet having a hole positioned to receive additional attachment components.

30. The bracket of claim 24, further comprising a support coupled to the bracket, and wherein the support includes a grommet having two disks spaced apart by a gap, the gap being positioned to receive a panel.

31. The bracket of claim 24 wherein the at least one attachment element depends from the web mount portion.

32. A bracket for supporting structures, comprising:
a first bracket member having a first surface and a second surface facing in a direction opposite the first surface, the first bracket member further having an aperture extending from the first surface to the second surface, and at least one first attachment member extending away from the first surface proximate to the aperture, the at least one first attachment member having an engagement portion;
a second bracket member generally identical to the first bracket member, the second bracket member having a first surface and a second surface facing in a direction opposite the first surface, the second bracket member further having an aperture extending from the first surface to the second surface, and at least one second attachment member extending away from the first surface proximate to the aperture, the at least one second attachment member having an engagement portion;
wherein the aperture of the first bracket member is sized to removably receive the at least one second attachment member with the engagement portion of the at least one second attachment member engaged with the second surface of the first bracket member; and
wherein the aperture of the second bracket member is sized to removably receive the at least one first attachment member with the engagement portion of the at least one first attachment member engaged with the second surface of the second bracket member.

33. The bracket of claim 32, further comprising a support coupled to the first bracket member and configured to carry an aircraft component.

34. The bracket of claim 32, further comprising a support coupled to the first bracket member and configured to carry an aircraft component, wherein the support is offset from the second surface of the first bracket member by a gap sized to receive the engagement portion of the at least one second attachment member.

35. The bracket of claim 32 wherein each of the first and second attachment members includes a column and a plurality of flexible snap elements depending from the column.

36. A method for manufacturing an aircraft, comprising:
coupling a plurality of aircraft frame members to each other, with at least one aircraft frame member having a plurality of mounting holes arranged in a plurality of mounting hole sets, and with each mounting hole set having at least one mounting hole;
inserting at least one attachment element of a bracket into the at least one mounting hole of at least one of the mounting hole sets to secure the bracket to the at least one frame member without the use of tools, the at least one attachment element being configured to be received by at least one mounting hole of any of multiple mounting hole sets, wherein at least another of the mounting hole sets is unoccupied by another bracket; and
attaching an aircraft component to the bracket.

37. The method of claim 36 wherein coupling a plurality of aircraft frame members includes coupling at least a first aircraft frame member and a second aircraft frame member, each being generally identical and having a plurality of mounting holes arranged in a plurality of mounting hole sets with each mounting hole set having at least one mounting hole, and wherein inserting at least one attachment element includes inserting at least one attachment element of a first bracket into at least one hole of the first aircraft frame member, and wherein the method further comprises inserting at least one attachment element of a second bracket into at least one mounting hole of the second aircraft frame member to secure the second bracket to the second aircraft frame member without the use of tools, the at least one mounting hole of the first aircraft frame member having a first position relative to the first aircraft frame member and the at least one mounting hole of the second aircraft frame member having a second position relative to the second aircraft frame member, the second position being different than the first position.

38. The method of claim 36 wherein coupling a plurality of aircraft frame members includes coupling at least a first aircraft frame member to a first aircraft and wherein inserting at least one attachment element includes inserting at least one attachment element of a first bracket into at least one hole of the first aircraft frame member, and wherein the method further comprises:

coupling a second aircraft frame member to a second aircraft, the second aircraft frame member being generally identical to the first aircraft frame member and having a plurality of mounting holes arranged in a plurality of mounting hole sets with each mounting hole set having at least one mounting hole; and inserting at least one attachment element of a second bracket into at least one mounting hole of the second aircraft frame member to secure the second bracket to the second aircraft frame member without the use of tools, the at least one mounting hole of the first aircraft frame member having a first position relative to the first aircraft frame member and the at least one mounting hole of the second aircraft frame member having a second position relative to the second aircraft frame member, the second position being different than the first position.

39. The method of claim 36, further comprising removing the bracket and from the at least one mounting hole and re-attaching the bracket at a different mounting hole.

40. The method of claim 36 wherein coupling a plurality of aircraft frame members includes coupling a plurality of aircraft frame members after the plurality of mounting holes have been provided in the aircraft frame members.

41. The method of claim 36 wherein inserting at least one attachment element includes inserting a column and a plurality of flexible snap elements depending from the column, and snapping the snap elements into engagement with a surface of the at least one aircraft frame member adjacent to the mounting hole.

42. The method of claim 36 wherein the at least one aircraft frame member includes a flange section and a web section, and wherein the method further comprises:

positioning a generally flat web mount portion of the bracket against the web section of the at least one aircraft frame member; and hooking a flange clip of the bracket around the flange section of the at least one aircraft frame member.

43. The method of claim 36 wherein the support includes a grommet having two disks spaced apart by a gap, and wherein attaching an aircraft component includes positioning a panel in the gap.

44. The method of claim 36 wherein the at least one aircraft frame member includes first and second spaced apart aircraft frame members, and wherein the method further comprises attaching the bracket to both the first aircraft frame member and the second aircraft frame member without the use of tools.

45. A method for manufacturing an aircraft, comprising:
coupling a plurality of aircraft frame members to each other, with at least one aircraft frame member having a flange section, a web section, and a plurality of mounting holes arranged in a plurality of mounting hole sets, and with each mounting hole set having at least one mounting hole;
positioning a generally flat web mount portion of a bracket against the web section of the at least one aircraft frame member;
hooking a flange clip of the bracket around the flange section of the at least one aircraft frame member to face toward the web mount portion;
inserting at least one attachment element of the bracket into the at least one mounting hole of at least one of the mounting hole sets to secure the bracket to the at least one frame member without the use of tools, the at least one attachment element being configured to be received by at least one mounting hole of any of multiple mounting hole sets; and
attaching an aircraft component to the bracket.

46. A method for manufacturing an aircraft, comprising:
providing at least one aircraft frame member having a plurality of mounting holes automatically formed therein, the mounting holes being arranged in a plurality of mounting hole sets with each mounting hole set having at least one mounting hole;
subsequently connecting the at least one aircraft frame member to other aircraft frame members;
inserting at least one attachment element of a bracket into the at least one mounting hole of at least one of the mounting hole sets to secure the bracket to the at least one aircraft frame member without the use of tools, the at least one attachment element being configured to be received by at least one mounting hole of any of at least two of the mounting hole sets, wherein at least another of the mounting hole sets is unoccupied by another bracket; and
attaching an aircraft component to the bracket.

47. The method of claim 46 wherein the at least one aircraft frame member includes a composite material, and wherein the method further comprises removing flash from the at least one aircraft frame member and forming holes in the at least one aircraft frame member while the at least aircraft frame member is in at least approximately the same position.

48. The method of claim 46 wherein the method further comprises automatically forming the mounting holes without providing a template for locating the mounting holes.

49. The method of claim 46, further comprising removing the bracket from the at least one mounting hole and re-attaching the bracket at a different mounting hole.

50. The method of claim 46, further comprising leaving at least some of the mounting holes unoccupied.

51. The method of claim 46 wherein inserting at least one attachment element includes inserting a column and a plurality of flexible snap elements depending from the column, and snapping the snap elements into engagement with a surface of the at least one aircraft frame member adjacent to the mounting hole.

52. The method of claim 46 wherein the at least one aircraft frame member includes a flange section and a web section, and wherein the method further comprises:
positioning a generally flat web mount portion of the bracket against the web section of the at least one aircraft frame member; and
hooking a flange clip of the bracket around the flange section of the at least one aircraft frame member.

53. The method of claim 46 wherein the support includes a grommet having two disks spaced apart by a gap, and wherein attaching an aircraft component includes positioning a panel in the gap.

54. The method of claim 46 wherein the at least one aircraft frame member includes first and second spaced apart aircraft frame members, and wherein the method further comprises attaching the bracket to both the first aircraft frame member and the second aircraft frame member without the use of tools.

55. A method for supporting aircraft structures, comprising:
positioning a first bracket member proximate to a first face of a frame member, the first bracket member having a first surface and a second surface facing opposite the first surface, the first bracket member further having an aperture extending from the first surface to the second surface, and at least one first attachment member extending away from the first surface proximate to the aperture, the at least one first attachment member having an engagement portion;

positioning a second bracket member proximate to a second face of the frame member facing generally opposite the first face of the frame member, the second bracket member being generally identical to the first bracket member, the second bracket member having a first surface and a second surface facing opposite the first surface, the second bracket member further having an aperture extending from the first surface to the second surface, and at least one second attachment member extending away from the first surface proximate to the aperture, the at least one second attachment member having an engagement portion;

inserting the at least one first attachment member of the first bracket member through a hole in the frame member and through the aperture of the second bracket member;

engaging the engagement portion of the at least one first attachment member with the second surface of the second bracket member;

inserting the at least one second attachment member of the second bracket member through the hole in the frame member and through the aperture of the first bracket member; and engaging the engagement portion of the at least one second attachment member with the second surface of the first bracket member.

56. The method of claim 55, further comprising inverting the second bracket portion relative to the first bracket portion before inserting the at least one attachment member of the second bracket.

57. The method of claim 55, further comprising attaching a first aircraft component to the first bracket portion and attaching a second aircraft component to the second attachment portion.

* * * * *